Inventors
FREDERICK P. MASON
GRAHAM J. L. STEVENS
By FRANK G. SMITH
Attorney

Inventors
FREDERICK P. MASON
GRAHAM J. L. STEVENS
By FRANK G. SMITH
Attorney

Inventors
FREDERICK P. MASON
GRAHAM J. L. STEVENS
FRANK C. SMITH
By [signature]
Attorney Inventors
FREDERICK P. MASON
GRAHAM J. L. STEVENS
By FRANK G. SMITH
Attorney

United States Patent Office 3,201,512

Patented Aug. 17, 1965

3,201,512

FACSIMILE SYSTEM HAVING PROVISION FOR HIGH SPEED SKIPPING OF BLANK AREAS

Frederick Percival Mason, Graham John Lloyd Stevens, and Frank Gerald Smith, all of Croydon, Surrey, England, assignors to Creed & Company Limited, Croydon, England, a British company Filed Aug. 31, 1961, Ser. No. 135,308

Claims priority, application Great Britain, Sept. 9, 1960, 31,171/60

7 Claims. (Cl. 178—6)

Figure 1:
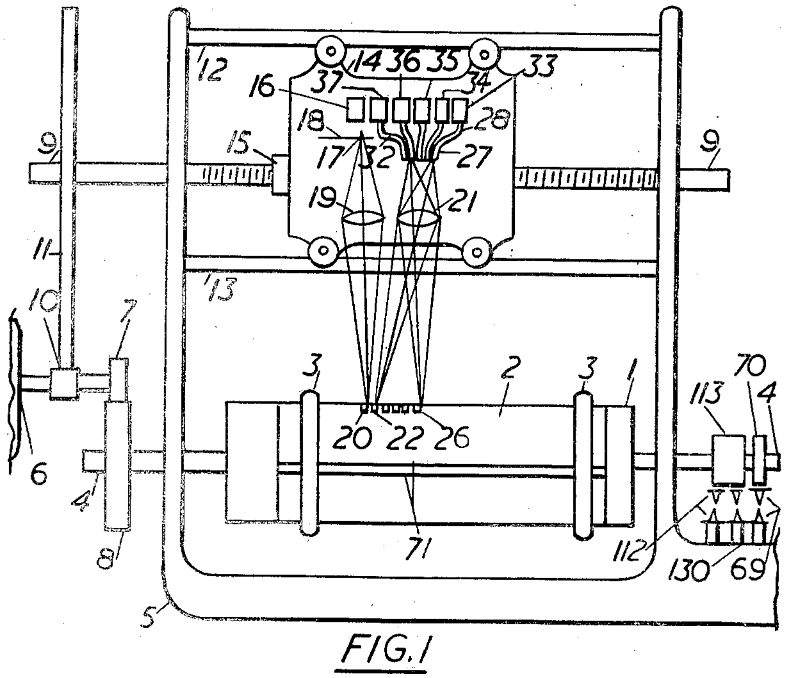

This invention relates to facsimile systems.

It is one of the objects of the present invention to reduce the time of transmission of facsimile data by providing a facsimile system in which means is provided to enable scanning means at the transmitter and recording means at the receiver to move relative to message forms or the like at a speed in excess of normal scanning speed when portions of the message form being scanned are devoid of information, and to enable the scanning and recording means to be moved relative to the message forms at normal scanning speed when the message form at the transmitter contains information.

The invention is applicable to facsimile systems in which information to be transmitted is printed or otherwise presented on a message-form or the like having a white background or a background on which the information is optically discernible, and in which drum type or flat bed scanners are employed.

According to one aspect of the invention therefore there is provided a facsimile system including a transmitter and a receiver, first and second scanners at the transmitter, said first scanner arranged to scan a portion of a message-form or the like in advance of the second scanner; and means operative for effecting, at a speed in excess of normal scanning speed, relative movement between the message-form and the scanners at the transmitter and between a message-form and recording means at the receiver in the absence of information on that portion of the message-form at the transmitter being scanned by the first scanner.

According to a further aspect of the invention therefore there is provided a facsimile system including a transmitter and a receiver, said transmitter including first and second means for scanning the content of a message-form or the like, said first scanning means being arranged to scan a plurality of consecutive positions on the message-form in advance of the second scanning means, means for effecting relative movement between the scanning means and the message-form during a scanning operation; said receiver including means for recording in facsimile the content of the message-form as scanned by the second scanning means, means for effecting relative movement between a second message-form or the like and the recording means during a recording operation; and electric circuit means operative by said first scanning means in the absence of information in the said plurality of consecutive positions on the message-form at the transmitter to cause said relative movements to be effected in synchronism at a speed in excess of normal scanning speed, and operative by the said first scanning means in the presence of information in one or more of said plurality of consecutive positions on the message-form at the transmitter to cause said relative movement to be effected in synchronism at normal scanning speed each time the second scanning means is in a position to scan the information present in one or more of the said plurality of consecutive positions on the message-form.

Figure 2:
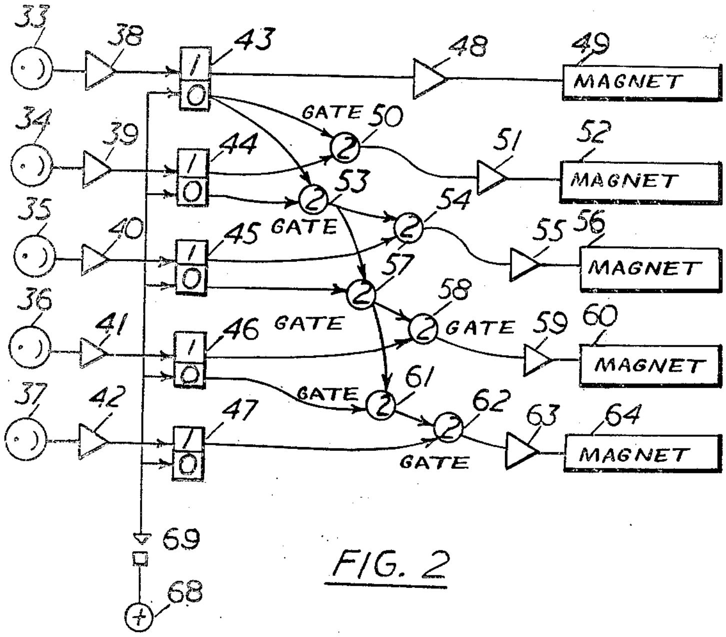
Figure 3:
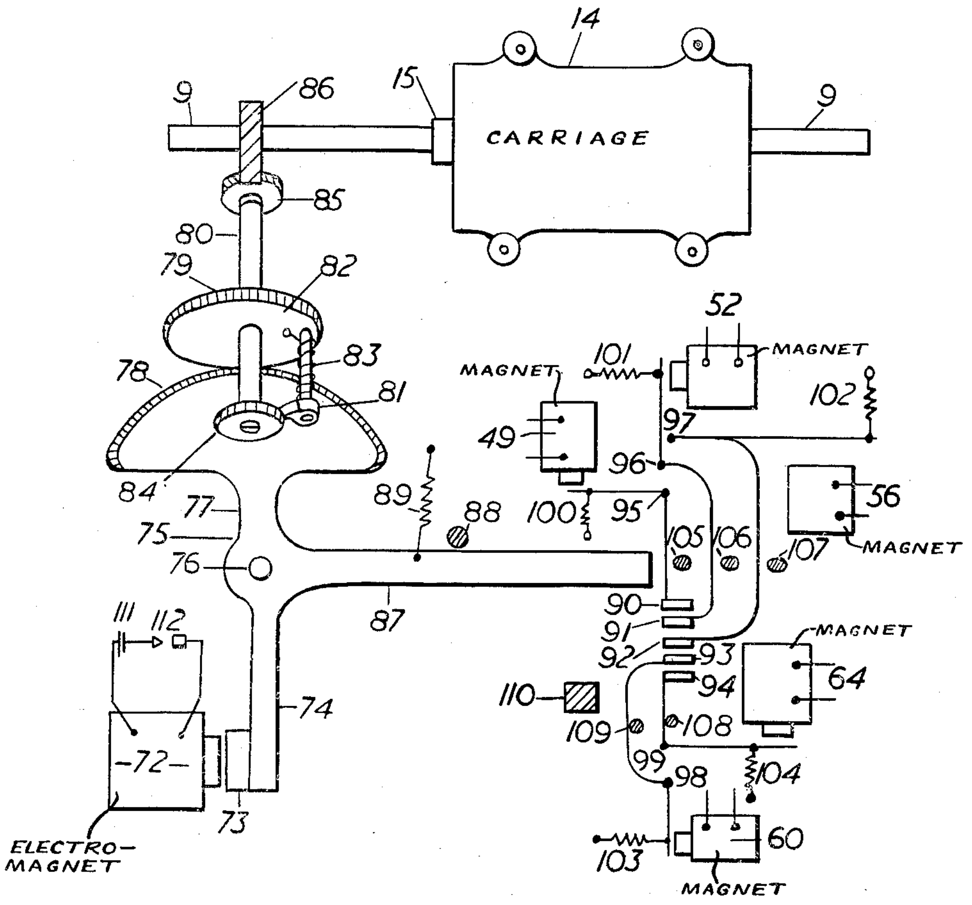
Figure 4:
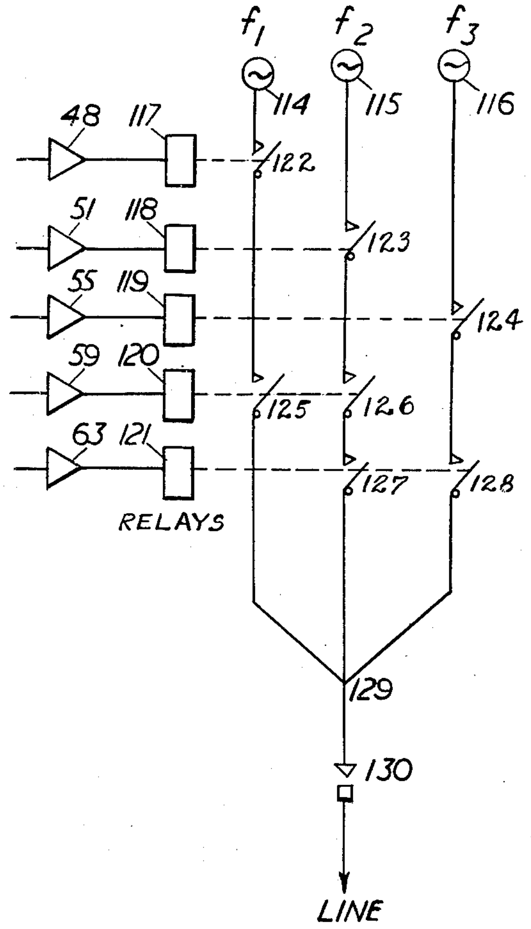
Figure 5:
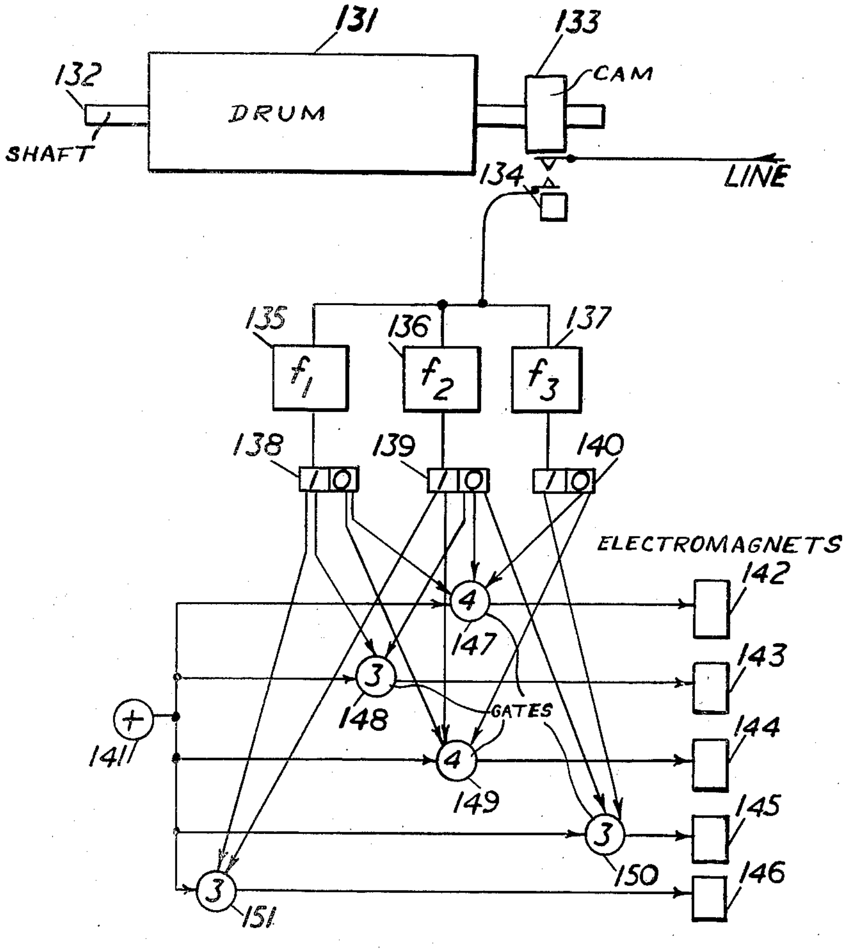

An embodiment of the invention will now be described with reference to the drawings accompanying the specification in which:

FIG. 1 shows a plan view of part of a facsimile transmitter,

FIG. 2 shows electric circuitry associated with an auxiliary scanner used in the transmitter of FIG. 1, FIG. 3 shows schematically means for effecting the advance of a carriage at the transmitter or receiver at a speed in excess of normal scanning speed or at normal scanning speed under control of the electric circuitry of FIG. 2, FIG. 4 shows electric circuitry associated with the arrangement of FIG. 3, and the receiver, and FIG. 5 shows a schematic of part of a facsimile receiver and electrical circuitry associated therewith.

According to the preferred embodiment of the invention, main and auxiliary scanners subject a portion of a message-form to independent and concurrent scrutiny with the auxiliary scanner scrutinising each of six scanning sweep positions ahead of the main scanner which is transmitting the information which it is currently scrutinising.

The effect of the scrutiny of the message-form by the main and auxiliary scanners is such that a single mark thereon of 0.006 inch extent may be resolved. For each of the six advance sweeps there is provided a bistable device. If during a sweep a mark is resolved the associated bistable device is set as the mark is encountered. The bistable device is reset immediately before the start of the next sweep. This means that the condition of the bistable devices is significant for the last 3% of each sweep.

The condition of the bistable devices at the end of each sweep indicates if that portion of the message-form encountered by the auxiliary scanner in the next, one, two, three, four, five or six transmission sweeps is devoid of information. If it is established that a portion of the message-form, subjected to the $n$th sweep, contains information then the scanning carriage is made to advance $n$ sweep pitches instead of one; and the transmitter emits at the end of the current sweep by the main scanner a pulse or pulse train constituting a "skip" signal whose characteristic corresponds to the value $n$.

Normally a receiver automatically advances its carriage by one sweep-pitch during the last 3% of each sweep. In a particular embodiment of the present invention, however, when a "skip" signal is received, the carriage advances not one but two, three, four, five or six sweep-pitches according to the characteristic of the "skip" signal.

The following description of one embodiment of the invention is relevant to a drum-type transmitter and recorder and a flat-bed scanner and receiver. An expert can interpret the description in relation to other types of facsimile apparatus.

In order to permit a decision to be reached as to whether a sweep shall be transmitted or not, it is necessary to know in advance if the sweep contains any information. Therefore while the main scanner transmits the $n$th sweep, an auxiliary scanner scans the $(n+1)$th sweep. If the auxiliary scanner observes a mark a decision is recorded that when the main scanner completes the $n$th sweep it shall then proceed to make sweep $(n+1)$. If, on the other hand, the auxiliary scanner does not observe a mark a decision is recorded that when the main scanner completes its $n$th sweep it shall then proceed to make sweep $(n+2)$.

The above described arrangement will permit isolated markless sweeps i.e. sweeps in which no information has been detected, to be omitted. However, it cannot attain omission of two successive markless sweeps because no information is available as to the content of the $(n+2)$th sweep and this sweep must therefore be made and transmitted.

By adding a second auxiliary scanner the content of sweep $(n+2)$ can be determined. Then, if both the first auxiliary scanner reveals that the sweep $(n+1)$ is markless and the second auxiliary scanner reveals that sweep $(n+2)$ is markless, a decision can be taken that when the main scanner completes the $n$th sweep it shall proceed to sweep $(n+3)$, so avoiding the transmission of two consecutive markless sweeps.

By the addition of a third auxiliary scanner it becomes possible to avoid scanning three consecutive markless sweeps. The arrangement may be extended by adding fourth, fifth, and sixth auxiliary scanners for four, five or six consecutive markless sweeps and so on, without limit. In the following description, a complement of five auxiliary scanners will be assumed.

To preserve simplicity, it is proposed that the main and auxiliary scanners be ganged. They will therefore proceed in unison, and, particularly, when the main scanner takes advantage of information supplied by the auxiliary scanners and "skips" a number of sweeps, then the auxiliary scanners also "skip" a like number of sweeps. This, however, does not result in any operational deficiency, as the total amount of information emitted by the auxiliary scanners is highly redundant, and the loss incurred by skipping is only what is tolerable. Specifically, during sweep $n$, information is derived regarding sweeps $(n+1)$, $(n+2)$, $(n+3)$, $(n+4)$, and $(n+5)$ and, as a result, it will sometimes happen that the main scanner will advance in one step from sweep $n$ to sweep $(n+6)$. However, as sweep $(n+6)$ is made and transmitted, sweeps $(n+7)$ to $(n+11)$ are scanned and all necessary information is available by the time the next decision has to be made.

For the purposes of illustrating the application of this arrangement to a facsimile equipment, the embodiment using a drum and carriage transmitter will first be considered in detail.

In FIG. 1 is shown a cylindrical drum 1 on which the message document 2 is mounted and retained, for example, by garters 3. Drum 1 is mounted on a spindle 4 supported in bearing frame 5. Drum 1 is rotated by the agency of motor 6 via gears 7 and 8. Also supported in bearing frame 5 is a shaft 9, threaded over the part lying between the bearings. Shaft 9 is rotated by motor 6 via gears 10 and 11. Rails 12 and 13 supported by frame 5 carry a carriage 14 provided with a nut 15 engaging the threaded part of shaft 9.

Motor 6 thus secures concurrent rotation of drum 1 and advancement of carriage 14.

Carriage 14 carries a photoelectric transducer 16 arranged to respond to light penetrating a small aperture 17 in baffle plate 18. A converging lens 19 is arranged to form an image of part of document 2 on plate 18. Device 16 thus responds to light from an elementary portion 20 of document 2, which is suitably illuminated by means not shown.

So far, elements 1 to 19 inclusive represent the essentials of a conventional type of facsimile transmitter. Phasing devices and signal amplifiers are not shown as they are not material to the present invention. There now follows a description of the additional elements required for the purposes of the present invention.

A lens 21 forms an image of elements 22, 23, 24, 25 and 26 (only 22 and 26 are indicated in the diagram) in plane 27. Five light guides of the kind well-known in the art of fibre-optics (each comprising an inner cylinder and a sheath of differing refractive index) 28, 29, 30, 31 and 32 are arranged to receive light emanating from elements 22 to 26 and to conduct this light to a series of five photoelectric transducers 33, 34, 35, 36 and 37.

It will be clear that while main scanner 16, 17, 18, 19, 20 examines the sweep including the element 20, auxiliary scanners 33, 28; 34, 29; 35, 30; 36, 31; and 37, 32; will, via the agency of lens 21, examiner the sweeps which include elements 22, 23, 24, 25 and 26 respectively.

*Information processing*

In FIG. 2, photoelectric transducers 33, 34, 35, 36 and 37 are those referred to in FIG. 1. Amplifiers 38, 39, 40, 41 and 42 serve to raise the power level of the outputs of devices 33 to 37 respectively sufficiently to permit staticisers 43, 44, 45, 46 and 47 to be set to their 1 states if during the course of scanning the devices 33 to 37 encounter marks on the message documents.

Amplifier 48 serves to secure operation of electromagnet 59 if device 33 encounters a mark. If device 33 does not encounter a mark there is no output from staticiser 43 to amplifier 48 and magnet 49 is not operated.

If device 33 does not encounter a mark but device 34 does, then staticiser 43 will be at 0 and 44 will be at 1. In this case the two inputs of switching device 50 are both marked (i.e. distinctively excited) and the output of device 50 is therefore also marked. It should be noted that the circle and enclosed numerical indication used in FIGURE 2 as schematic symbols for switching devices, such as the device 50, are commonly understood to represent switching circuits which are responsive to excitation of at least the indicated number of inputs to provide a distinctive output variation (see, for example, U.S. Patent 2,952,732, granted September 13, 1960, to E. P. G. Wright et al.). Thus, those reasonably skilled in the switching arts will appreciate that the device 50 is an ordinary AND-circuit which, under the above-stated input conditions, delivers an output. This output, amplified by amplifier 51, causes magnet 52 to operate.

If neither device 33 nor 34 encounters a mark, but device 35 does, then staticisers 43 and 44 will be at 0 but staticiser 45 will be at 1. In this case gate 53 receives its necessary two inputs and delivers an output to gate 54 which also receives an input from staticiser 45 and therefore delivers an output which is amplified at 55 to operate magnet 56.

If none of the devices 33, 34, or 35 encounter a mark, but device 36 does, then staticisers 43, 44 and 45 will be at 0, but staticiser 46 will be at 1. In this case gates 53 and 57 receive their necessary two inputs and gate 57 delivers an output to gate 58 which also receives an input from staticiser 46 and therefore delivers an output which is amplified at 59 to operate magnet 60.

If none of devices 33, 34, or 36 encounter a mark, but device 37 does, then staticisers 43, 44, 45 and 46 will be at 0 but staticiser 47 will be at 1. In this case gates 53, 57 and 61 receive their necessary two inputs and gate 61 delivers an output to gate 62 which also receives an input from staticiser 47 and therefore delivers an output which is amplified at 63 to operate magnet 64.

If none of devices 33, 34, 35, 36 or 37 encounter a mark, staticisers 43 to 47 will all be set to 0 and gates 50, 54, 58 and 62 are all deprived of one of their necessary two inputs so that none of them delivers an output and none of the magnets operate.

It will thus be seen that the following conditions apply:

| Device | | | | | Magnet operated |
|---|---|---|---|---|---|
| 33 | 34 | 35 | 36 | 37 | |
| M | (any combination) | | | | 49 |
| — | M | (any combination) | | | 52 |
| — | — | M | (any combination) | | 56 |
| — | — | — | M | (either cond.) | 60 |
| — | — | — | — | M | 64 |
| — | — | — | — | — | None |

It will be seen that the resulting condition of magnets 49, 52, 56, 60 and 64 is so related to the experience of devices 33 to 37 that the following decision can be taken:

| Magnet operated | 49 | 52 | 56 | 60 | 64 | None |
|---|---|---|---|---|---|---|
| Decision | Feed one step. | Feed two steps. | Feed three steps. | Feed four steps. | Feed five steps. | Feed six steps. |

In the next section it will be shown how the operation of the magnets can secure the appropriate amount of feed of carriage 14.

After the condition of magnets 49, 52, 56, 60 and 64 has determined the amount of feed of carriage 14, it is necessary that staticisers 43 to 47 be reset ready for the next examination of the copy. The reset is secured by providing a power source 68 and contacts 69 so that momentary closure of contacts 69 serves to effect the reset.

Contacts 69 are depicted also in FIG. 1, where they are shown co-operating with cam 70 on shaft 4. Cam 70 is so formed that contacts 69 are closed briefly at the instant when the edges 71 of the message form pass the scanning point.

The sequence during one revolution of drum 1 is thus that for approximately 95% of the revolution the devices 16 and 33 to 37 are examining the copy and magnets 49, 52, 56, 60 and 64 are set up; for the next 4% of the revolution trolley 14 is advanced by an amount determined by the setting of the magnets; and during the last 1% of the revolution contacts 69 are closed by cam 70 and staticisers 43 to 47 are reset.

*Utilisation of processed information*

In FIG. 3 is shown an arrangement in which the advance of the carriage 14 of FIG. 1 may be controlled in accordance with the condition of the electromagnets of FIG. 2. For this purpose the connection between shaft 9 and motor 6 is broken by removal of gears 10 and 11. In place of this connection is provided an electromagnet 72 capable of attracting armature 73 carried by arm 74 of a three armed member 75 pivoted at 76. Upper arm 77 carries toothed segment 78 which meshes with gear 79 mounted loosely on shaft 80 carried in bearings not shown. A pawl 81 is pivoted on a pin 82 projecting from gear 79, and a spring 83 urges pawl 81 into contact with the teeth of ratchet wheel 84 fixed to shaft 80. A gear 85 also fixed to shaft 80 meshes with gear 86 fixed to shaft 9 (which was shown in FIG. 1). Shaft 9 when rotated can cause translation of carriage 14 via nut 15.

It will be seen that energisation of magnet 72 will cause armature 73 to move leftwards taking arm 74 with it thus causing member 75 to rotate clockwise. Consequently arm 77 carries segment 78 clockwise and gear 79 turns anticlockwise. Pawl 81, engaging with ratchet 84 carries it anticlockwise and via shaft 80 rotates gears 85 and 86 to turn shaft 9 to cause trolley 14 to feed along the axis of shaft 9.

To permit magnets 49, 52, 56, 60 and 64 to determine the extent of the feed of trolley 14 when magnet 72 is energised member 75 is provided with a third arm 87 normally urged against stop 88 by spring 89. A series of interposing members 90 to 94 is provided, pivoted at 95 to 99 normally urged by springs 100 to 104 against stops 105 to 109. In this condition members 90 to 94 are all out of range of arm 87 and upon energisation of magnet 72 member 75 rotates until arm 87 strikes stop 110 and the maximum feed of six sweep-pitches is imparted to carriage 14.

If magnet 49 is energised, member 90 is moved to intercept arm 87 and the motion imparted is one sweep pitch only (irrespective of the condition of the remaining magnets).

Similarly, energisation of magnets 52, 56, 60 or 64 will result in the interposition of members 91, 92, 93 or 94 to intercept arm 87 at those positions corresponding to a feed of two, three, four or five sweep pitches of carriage 14.

The energisation of magnet 72 is secured by the agency of a power source 111 and contacts 112. Contacts 112 are operated by cam 113 on shaft 9 for a period which results in armature 73 being attracted for the 4% of the revolution, referred to above, during which magnets 49, 52, 56, 60 and 64 are in a significant condition. The power of magnet 72 is sufficient to secure the necessary motion of carriage 14 in this time.

*Receiver*

It would be possible to employ a conventional recorder to record the documentary information emitted by a transmitter of the kind described above. However, the recorded version of the document would then correspond to the original document with all of the white horizontal strips eliminated, and such a reproduction would be difficult to read.

It is therefore desirable that a recorder should be used which inserts the white strips which are skipped by the transmitter.

Such a recorder may be formed by endowing a conventional recorder with means for advancing down the page in steps of diverse size, the size of the step being controlled by information provided by the transmitter.

An arrangement applicable to a drum-type recorder is described below. An expert can interpret this description in relation to any other conventional type of recorder.

*The Emission of information by the transmitter*

While the transmitter advances its scanning carriage it emits a pulse or pulse train which shall indicate by its character how many sweep-pitches the carriage is advancing. A pulse train used for this purpose could comprise three binary pulses capable of indicating from one to eight sweep-pitches. Alternatively six binary pulses could be used, of which one would be of the opposite kind to all of the others, the position of this unique pulse signifying the number of sweep-pitches being skipped. Alternatively, a single pulse may be used whose carrier frequency is indicative of the number of sweep-pitches being skipped. A yet further alternative is to emit concurrently none, one, two or three pulses of different frequencies which may have the following significance.

| Frequencies emitted: | Extent of feed (pitches) |
|---|---|
| None | 1 |
| $f_1$ only | 2 |
| $f_2$ only | 3 |
| $f_3$ only | 4 |
| $f_1$ plus $f_2$ | 5 |
| $f_2$ plus $f_3$ | 6 |

It is advantageous to use this last arrangement and this result can be secured by providing three alternating current sources (shown as 114, 115 and 116 in FIG. 4) having frequencies $f_1$, $f_2$ and $f_3$ respectively. It is desirable that $f_1$, $f_2$ and $f_3$ should be non-harmonically related. It is arranged that amplifiers 48, 51, 55, 59 and 63 shall, besides energising magnets 49, 52, 56, 60 and 64, energise relays 117, 118, 119, 120 and 121 respectively. Relay 117 carries contacts 122; relay 118 has contacts 123 and relay 119 has contacts 124. Relay 120 has two contacts, 125 and 126, while relay 121 has contacts 127 and 128. Contacts 122 to 128 are wired as shown in FIG. 4 to produce a joint output at terminal 129 which is at all times related to the instantaneous condition of relays 117 to 121 and hence to the experience of devices 33 to 37. At the time when the state of staticisers 43 to 47 is significant, that is during the closure of contacts 112, a further pair of contacts 130 is closed to permit the joint output at terminal 129 to pass to the communication line and hence to the receiver. Contacts 130 are operated by cam 113 on shaft 4 (FIG. 1).

*Processing of information*

The mechanism of the receiver will contain a drum and shaft similar to that of the transmitter. Let these be designated by 131 and 132 of FIG. 5. It will be understood that shaft 132 of FIG. 5 and shaft 4 of FIG. 1 rotate in phase with each other in the conventional manner. Thus, a cam 133 can be provided to close a pair of contacts 134 at the same time as cam 113 closes contacts 130. Contacts 134 are interposed between the communication line and a group of three detectors 135, 136 and 137. Each of these detectors comprises a tuned amplifier followed by a rectifier. The detectors are connected respectively to staticisers 138, 139 and 140. As detectors 135, 136 and 137 are tuned respectively to frequencies $f_1$, $f_2$ and $f_3$, staticiser 138 changes from 0 to 1 upon receipt of frequency $f_1$, and 139 and 140 upon receipt of frequency $f_2$ and $f_3$ respectively.

A power source 141 is capable of energising any one of electromagnets 142 to 146, as determined by three-input gates 148, 150 and 151, and four-input gates 147 and 149. If none of the frequencies $f_1$, $f_2$ or $f_3$ are received, staticisers 138, 139 and 140 are all at 0, opening gate 147 and allowing source 141 to energize magnet 142. Receipt of frequency of $f_1$ permits magnet 143 to operate providing $f_2$ is not received. Receipt of frequency $f_2$ permits magnet 144 to operate providing neither $f_1$ nor $f_3$ are received. Receipt of frequency $f_3$ permits magnet 145 to operate providing $f_2$ is not received. Receipt of frequencies $(f_1+f_2)$ permits magnet 146 to operate. Receipt of frequencies $(f_2+f_3)$ causes all magnets to remain unoperated.

It will be seen that the conditions of magnets 142, 143, 144, 145, and 146 exactly duplicates the conditions of magnets 49, 52, 56, 60 and 64 respectively. Therefore, if the receiver is provided with a trolley-advancing mechanism which is a duplicate of that described for the transmitter and shown in FIG. 3, the recorder trolley will move in unison with that at the transmitter, and when the transmitter skips white strips of the copy the recorder will leave a corresponding amount of the recording sheet blank.

What we claim is:

1. A facsimile system including a transmitter and a receiver, said transmitter including first and second means for scanning the content of a message-form or the like, said first scanning means being arranged to scan a plurality of consecutive positions on a message-form in advance of the second scanning means, means for effecting relative movement between the scanning means and the message-form during a scanning operation; said receiver including means for recording in fascimile the content of the message-form as scanned by the second scanning means, means for effecting relative movement between a second message-form or the like and the recording means during a recording operation; and electric circuit means operative by said first scanning means in the absence of information in the said plurality of consecutive positions on the message-form at the transmitter to cause said relative movements to be effected in synchronism at a speed in excess of normal scanning speed, and operative by the said first scanning means in the presence of information in one or more of said plurality of consecutive positions on the message-form at the transmitter to terminate said higher speed relative movements each time the second scanning means is in a position to scan the information present in one or more of the said plurality of consecutive positions on the message-form.

2. A facsimile system as claimed in claim 1 in which said first scanning means is a plurality of photocells like in number to the said plurality of consecutive positions on the message-form at the transmitter, and each of which said photocells generates an electric current signal in the presence of information in one of said plurality of consecutive positions subjected to the scrutiny of the photocell, and in which said second scanning means is constituted by a single photocell.

3. A facsimile system comprising a transmitter and a receiver, said transmitter including first and second means for scanning the content of a message-form or the like, said first scanning means being arranged to scan a plurality of consecutive positions on the message-form in advance of the second scanning means, means for effecting relative movement between the scanning means and the message-form during a scanning operation, said receiver including means for erecording in facsimile the content of the message-form as scanned by the second scanning means, means for effecting relative movement between a second message-form or the like and the recording means during a recording operation; and electric circuit means operative by said first scanning means in the absence of information in the said plurality of consecutive positions on the message-form at the transmitter to cause said relative movements to be effected in synchronism at a speed in excess of normal scanning speed, and operative by the said first scanning means in the presence of information in one or more of said plurality of consecutive positions on the message-form at the transmitter to cause said relative movement to be effected in synchronism at normal scanning speed each time the second scanning means is in a position to scan the information present in one or more of the said plurality of consecutive positions on the message-form; said first scanning means comprising a plurality of photocells like in number to the said plurality of consecutive positions on the message-form at the transmitter, each said photocell generating an electric current signal in the presence of information in one of said plurality of consecutive positions subjected to the scrutiny of the photocell; said second scanning means comprising a single photocell; each said means for effecting relative movement comprising an electromagnet operative when energized by an electric current signal from the transmitter to advocate the carriage with respect to the message-form by way of a quadrant gear, ratchet and pawl means, and a lead-screw engaging a nut on the carriage.

4. A facsimile system as claimed in claim 3 in which said electric circuit means includes a plurality of electromagnets at the transmitter and receiver, each said plurality of electromagnets being like in number to the said plurality of photocells of the first scanning means, complementary one of which electromagnets of the pluralities are electricall connected to a particular one of said plurality of photocells of the first scanning means, in which the said complementary ones of the pluralities of electromagnets are energised simultaneously by electric current signals generated by their particular photocell of the first scanning means when that photocell detects the presence of information in one of said plurality of consecutive positions on the message-form at the transmitter, and in which the said energised electromagnets attract thereto interposers which intercept arms incorporated on the quadrant gears of the respective driving means at the transmitter and receiver to arrest movement of the quadrant gears in their action of advancing the carriages at a speed in excess of normal scanning speed and to permit the second scanning means and the recording means to scan and to record respectively at normal scanning speed, the information detected in the said one of said plurality of consecutive positions on the message form detected by the first scanning means.

5. In a facsimile transmitter and the combination of first means for cyclically scanning elemental lines on a document, a plurality of second scanning means for scanning a corresponding plurality of consecutive elemental lines in advance of the line being scanned by said first means, during each operation of said first means, and means operative in accordance with the combined outputs of said second scanning means for advancing the relative positions of said document and said scanning means intermediate successive scanning operations to bring a selected one of said plurality of advance lines into correspondence with said first scanning means, in accordance with the said combined outputs of said second scanning means.

6. In a facsimile receiver the combination of means for receiving a signal representing facsimile information, means coupled to said receiving means for cyclically recording elemental lines of facsimile in accordance with the output of said receiving means, means coupled to said recording means for advancing said recording means through a variable number of consecutive elemental line scanning positions in one continuous operation, the maximum range of displacement of said advancing means being greater than that corresponding to two consecutive line scanning positions, and means coupled to said receiving means and said advancing means for selectively operating said advancing means, intermediate consecutive recording operations, to advance said recording means to any line scanning position within the said maximum range of said advancing means in accordance with a received signal.

7. In a facsimile system—including lime scanning means and document holding means one of which means is mounted on a carriage for displacement relative to the other means in a direction transverse to the lines scanned by said scanning means—a device for variably displacing said carriage intermediate successive line scan operations comprising: a ratchet wheel assembly coupled to said carriage; a rotatable member including first and second radially extending arms and a coupling segment; means including a pawl member coupled between said coupling segment of said rotatable member and said ratchet wheel assembly for imparting unidirectional motion to said carriage via said ratchet wheel in response to one direction of movement of said rotatable member, means coupled to said first radially extending arm for reciprocally displacing said rotatable member, relative to a reference position thereof, first in said one direction and then in the opposite direction, the maximum range of said displacement in said one direction exceeding that required to displace said carriage through two consecutive scanning line positions, and a plurality of means interposable in the path of movement of said second radially extending arm, during movement thereof in said one direction, for selectively determining the extent of said displacement of said rotatable member in said one direction.

References Cited by the Examiner

UNITED STATES PATENTS 2,287,413 6/42 Bruce et al. ____________ 178—6.6

DAVID G. REDINBAUGH, *Primary Examiner.*
ROY LAKE, *Examiner.*